(12) United States Patent
Hung

(10) Patent No.: US 7,142,710 B2
(45) Date of Patent: Nov. 28, 2006

(54) COLOR IMAGE PROCESSING METHOD AND COLOR IMAGE PROCESSING APPARATUS

(75) Inventor: Po-Chieh Hung, Hachioji (JP)

(73) Assignee: Konica Corporation (JP)

( * ) Notice: Subject to any disclaimer, the term of this patent is extended or adjusted under 35 U.S.C. 154(b) by 735 days.

(21) Appl. No.: 10/342,662

(22) Filed: Jan. 14, 2003

(65) Prior Publication Data

US 2003/0138142 A1    Jul. 24, 2003

(30) Foreign Application Priority Data

Jan. 24, 2002    (JP)    ............... 2002-015444

(51) Int. Cl.
*G06K 9/00*    (2006.01)
(52) U.S. Cl. ........................ 382/162; 382/167
(58) Field of Classification Search ............... 382/107, 382/167, 162, 166; 345/591, 632, 600, 604, 345/606, 589; 358/529, 1.9, 3.03; 375/240.18
See application file for complete search history.

(56) References Cited

U.S. PATENT DOCUMENTS

| | | | | |
|---|---|---|---|---|
| 4,829,455 A | * | 5/1989 | Long et al. | 345/632 |
| 5,070,413 A | * | 12/1991 | Sullivan et al. | 358/3.03 |
| 5,212,546 A | * | 5/1993 | Arazi et al. | 358/518 |
| 6,005,968 A | * | 12/1999 | Granger | 382/162 |
| 6,101,272 A | * | 8/2000 | Noguchi | 382/167 |
| 6,137,495 A | * | 10/2000 | Gondek | 345/600 |
| 6,243,420 B1 | * | 6/2001 | Mitchell et al. | 375/240.18 |
| 6,456,293 B1 | * | 9/2002 | Grandy | 345/591 |
| 6,522,425 B1 | * | 2/2003 | Yoshidome | 358/1.9 |
| 6,778,300 B1 | * | 8/2004 | Kohler | 358/529 |
| 6,956,967 B1 | * | 10/2005 | Gindele et al. | 382/167 |
| 6,999,604 B1 | * | 2/2006 | Kim et al. | 382/107 |

FOREIGN PATENT DOCUMENTS

| | | | |
|---|---|---|---|
| EP | 0737001 A2 | * | 10/1996 |
| JP | 53-123201 | | 10/1978 |
| JP | 2528463 | | 6/1996 |
| JP | 408265588 A | * | 10/1996 |

OTHER PUBLICATIONS

Akira Yoda et al., "Color Image Processing in Fujifilm's Digital Imaging Services", IS&T's 2001 PICS Conference Proceedings, p. 55-58.
Po-Chieh Hung, "Colorimetric Calibration in Electronic Imaging Devices Using a Look-Up-Table Model and Interpolations", Journal of Electronic Imaging, Jan. 1993, vol. 2(1); p. 53-61.

* cited by examiner

*Primary Examiner*—Anh Hong Do
(74) *Attorney, Agent, or Firm*—Cantor Colburn LLP

(57) ABSTRACT

An image processing method for subjecting image signals from an image input apparatus to a color transform and an image processing for an output apparatus, including the steps of conducting a first color transform process to practice color transform from data for a first image medium into data for a second image medium; and conducting a second color transform process to practice a color transform from data for the second image medium to data for the first image medium, wherein the first color transform process and the second color transform process are in an approximately inverse relation with each other.

8 Claims, 5 Drawing Sheets

COLOR IMAGE PROCESSING METHOD AND COLOR IMAGE PROCESSING APPARATUS

BACKGROUND OF THE INVENTION

This invention relates to a color image processing method and a color image processing apparatus.

In recent years, development of print systems have been in progress, and it has been put into practice to use a system in which an image on a film is read by a scanner and the image is converted into image data, by the use of which an image is printed after image processing by a printer. A system of such a type is called a mini-laboratory. A system of such a type is based on a film (a negative film), and is made up according to a way of thinking which is the same as conventional photography without a colorimetric concept. That is, a dye quantity space is used.

For the purpose of actualizing this system, it is used a method in which inputted image data are transformed into data in density region (dye quantity region) by a tone transform, and printing is done after a matrix transform and the modification of tone. FIG. 9 shows the concept of a conventional system. The system shown in the drawing is such that R, G, and B signals are inputted as scanner signals, and after the respective tone transforms, C, M, and Y printer signals are produced.

In the drawing, 1 denotes a tone transform section for inputting data of red (R) out of image data obtained by the scanning of a film by a scanner and practicing tone transform, 2 denotes a tone transform section for inputting data of green (G) out of the scanner signals and practicing tone transform in the same way, and 3 denotes a tone transform section for inputting data of blue (B) out of the scanner signals and practicing tone transform in the same way.

Further, 4 denotes a matrix transform section for receiving output signals of these tone transform sections 1 to 3 and practicing matrix transform, 5 denotes a tone transform section for receiving an output signal of said matrix transform section 4 and practicing tone transform to output a signal of cyan (C), 6 denotes a tone transform section for receiving another output signal of said matrix transform section 4 and practicing tone transform to output a signal of magenta (M), and 7 denotes a tone transform section for receiving another output signal of said matrix transform section 4 and practicing tone transform to output a signal of yellow (Y).

To explain the operation of the system having such a structure, it will be as follows.

The scanner (not shown in the drawing) scans a negative film (not shown in the drawing) to output scanner signals R, G, and B. These scanner signals R, G, and B are inputted to the respective tone transform sections 1 to 3, undergo tone transform, and are transformed into signals representing density (dye quantity). The image signals, after transformed, are inputted to the matrix transform section 4, and are subjected to matrix transform. The signals, after subjected to matrix transform, are inputted to the respective tone transform sections 5 to 7, and are subjected to tone transform, to be outputted as printer signals C, M, and Y for a printer. The printer (not shown in the drawing) prints a color image on the basis of these printer signals.

On the other hand, there is a requirement to write digital signals generated in the process of a signal processing in an electronic medium such as a CD-R and to appreciate the image on a display. In the case where certain image data are once written in an electronic medium, and an image is printed from the electronic medium, there is an advantage that the same color reproduction as in the case of an image directly printed from a negative film can be obtained.

However, at the same time, it is necessary that the digital signals present a correct appearance when the image is displayed on a display. In "A. Yoda et al, 'Color Image Processing in Fujifilm's Digital Imaging Servers', IS & T's PICS Conference (2001)", it is shown to make a color transform with a reference printer taken for the reference.

In a method using dye quantity, owing to no calorimetric reference being present, when it is intended to display an image on another medium such as a CRT or a liquid crystal display, a correct color reproduction is not made in some cases. For example, there is a problem that the color of an image as printed is not reproduced on a display such as a CRT, in the case where signals to be transmitted to a printer are directly recorded in a CD-R as they are.

Further, there has been also a problem that, in the case where an image was printed from a medium in which the image data were recorded, for example, in the case where the data were recorded in such a way that a correct color was presented when the image was displayed on a display of the sRGB standard (specified in the standard RGB Standard: IEC 61966-2-1), printing by the use of this system could not be done appropriately.

In the example of the above-mentioned reference, even in the case of direct printing, a two-time process, that is, a print scanner→a reference printer, and the reference printer→a printer, is required, and as regards a method of preparing the inverse (YMCK→RGB) LUT, it is made only a description to the effect that an inverse color gamut mapping is carried out. For this reason, the calculation load was heavy, and for the preparation of the inverse LUT, it was necessary every time to carry out a transform into a uniform color space and color gamut mapping in it. Owing to this color gamut mapping, there has been a problem that the working time of operation was increased, and an error was produced in the process of the inverse transform.

This invention was made in view of the above-mentioned problems, and it is its object to provide such an image processing method and an image processing apparatus as to make a printed color approximately the same as a color represented on a display in the case where a negative film is read by a scanner. Further, it is another object of the invention to provide an image processing method and an image processing apparatus capable of carrying out the calculation correctly and easily, for LUT's in the inverse relationship with each other used in this method. A further object of this invention is to provide an image processing method and an image processing apparatus not requiring two-time color gamut mapping and being capable of processing data by an inverse operation only, hence having no problem accompanied by the above-mentioned color gamut mapping. Further, it is another object of the invention to provide an image processing method and an image processing apparatus capable of making it possible to easily apply an optimized color transform to image data, in the case where the image data are not those which have not been recorded by this system.

SUMMARY OF THE INVENTION (1) An image processing method having, in the case where signals from an image input apparatus are subjected to a color transform and image processing for an output apparatus, a first color transform process to practice color transform from data for a first image medium into data for a second image medium, and a second color transform process to practice a color transform from data for said second image medium to data for said first image medium, characterized by said first color transform process and said second color transform process being in an approximately inverse relation with each other.

By this structure, only a color transform of a minimum amount of processing is required in the case where image data are transformed directly for an output apparatus, and when the data are outputted by another electronic storage medium and are displayed on a CRT or the like, it can be reproduced with colors approximately resembling those represented by the printer; further, in the case where image data written in the electronic storage medium are outputted as a printed image, the color reproduction becomes equal to that in the case of the image being directly printed, and a stable color reproduction is possible.

(2) An image processing method as set forth in the structure (1) characterized by the aforesaid image input apparatus being a scanner for obtaining a digital signal by the scanning of a photographic medium.

By this structure, in the case where color reproduction having a photographic tone is carried out, it is easy to give and receive image data to and from another medium.

(3) An image processing method as set forth in the structure (1) characterized by checking, in the case where the image data are subjected to a color transform from the aforesaid second image medium to the aforesaid first medium, whether or not image data are transformed by a color transform corresponding to the aforesaid first color transform process, and selecting another color transform process in the case of the transform not corresponding to it.

By this structure, because an optimized LUT can be automatically utilized, it is possible to actualize a printer having the ease of operation.

(4) An image processing method as set forth in the structure (1) having the aforesaid color transform processes in an approximately inverse relation with each other, characterized by practicing one of them by the use of an multi-dimensional LUT, and practicing the other by the use of an LUT prepared on the basis of said multi-dimensional LUT.

In the above description, the term "multi-dimensional LUT" means, for example, an LUT having a multiple dimensions such as Y, M, C, and K (4 dimensions in this case). In this specification, there is no particular number of the dimensions to be taken.

By this structure, calculation is simplified, and the precision of restoration is raised.

(5) An image processing method as set forth in the structure (1) characterized by the aforesaid first color transform process being such one as to make a color transform from a CMY system to an RGB system, and the aforesaid second color transform process being such one as to make a color transform from an RGB system to a CMY system.

By this structure, in a transform from a CMY system to an RGB system and a transform from the RGB system to the CMY system, it is possible to bring these transforms in an approximately inverse relation with each other.

(6) An image processing method as set forth in the structure (4) characterized by the preparation of an LUT for use in the aforesaid color transform being done in such a way as to make tristimulus values or color values derived from tristimulus values of colors in an image printed by a printer with a CMY system used approximately equal to tristimulus values or color values derived from tristimulus values of colors in an image displayed on a display with an RGB system used.

By this structure, it is possible to prepare an LUT on the basis of tristimulus values or color values derived from tristimulus values.

(7) An image processing method as set forth in any one the above-mentioned structures (1) to (6) characterized by the aforesaid first image medium being a printer, and the aforesaid second image medium being a display.

By this structure, in each of the transforms from a first image medium to a second image medium and from said second medium to said first medium, it is possible to make the relation between one and the other approximately inverse.

(8) An image processing apparatus for carrying out color transform of image signals from an image input apparatus and applying image processing for an output apparatus to said image signals, characterized by comprising a first color transform means (section) for carrying out a color transform of data for a first image medium into data for a second image medium, and a second color transform means (section) for carrying out a color transform of data from said second image medium into data for said first image medium, said first color transform means (section) and said second transform means (section) being in an approximately inverse relation with each other.

By this structure, only a color transform of a minimum amount of processing is required in the case where image data are transformed directly for an output apparatus, and when the data are outputted by another electronic storage medium and are displayed on a CRT or the like, it can be reproduced with colors approximately resembling those represented by the printer; further, in the case where image data written in the electronic storage medium are outputted as a printed image, the color reproduction becomes equal to that in the case of the image being directly printed, and a stable color reproduction is possible.

DETAILED DESCRIPTION OF THE PREFERRED EMBODIMENT

Figure 1:
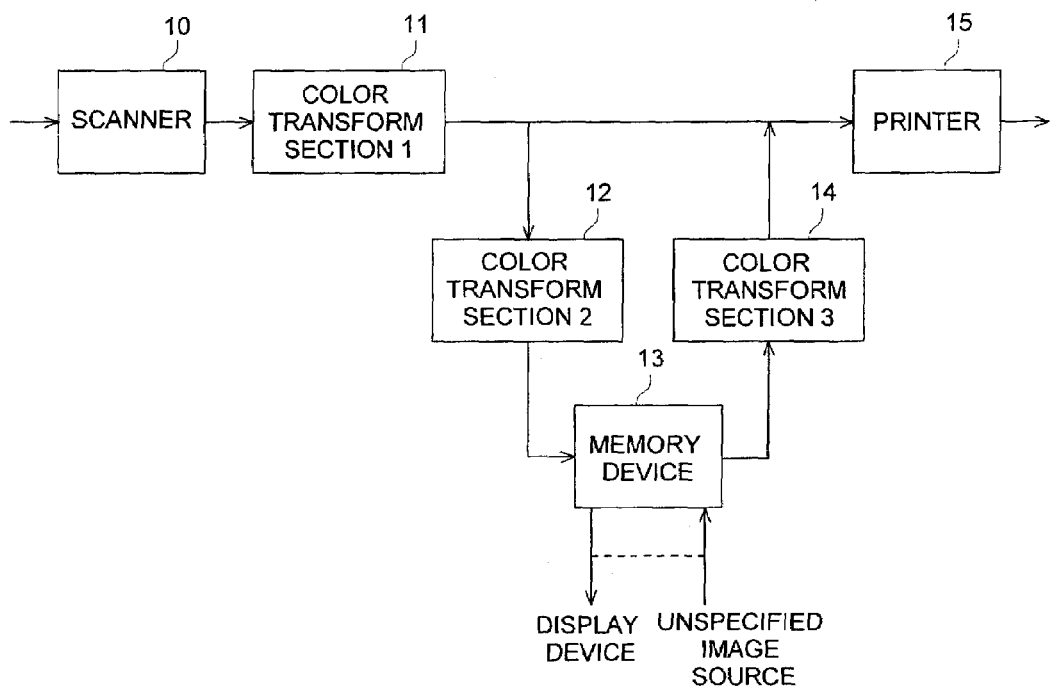
FIG. 1 is a block diagram showing the first example of the embodiment of this invention.

In the following, with reference to the drawings, examples of the embodiment of this invention will be explained in detail. FIG. 1 is a block diagram showing the first example of the embodiment of this invention. In the drawing, 10 denotes a scanner for obtaining digital image data by scanning a document, a film, or the like. From said scanner 10, color image data R, G, and B are outputted. 11 denotes a first color transform section (hereinafter referred to as the color transform section 1) for receiving R, G, and B data from the scanner 10 and practicing color transform. Said color transform section 1 transforms R, G, B data into, for example, C, M, Y data.

Further, 12 denotes a second color transform section (hereinafter referred to as the color transform section 2) for practicing color transform of output signals of the color transform section 1, and 13 denotes a storage device for storing output data of the color transform section 2. For said storage device 13, for example, a hard disk device is used. Output signals from the storage device 13 are transmitted, for example, to a display device. Further, unknown image data from outside are inputted and stored in the storage device 13.

Further, 14 denotes a third color transform section (hereinafter referred to as the color transform section 3) for practicing color transform of image data read out from the storage device 13. 15 denotes a printer for receiving image data which are outputs of the color transform section 1 or the color transform section 3 and printing the image. To explain the operation of an apparatus having the above-mentioned structure, it will be as follows.

The scanner 10 scans a film, a document, or the like and outputs a set of digital image signals (a set of film scanner signals). This set of film scanner signals is inputted to the succeeding color transform section 1. Said color transform section 1 adjusts the density, color balance, etc. in accordance with the kind of the film etc., and outputs the image data in a suitable color space (dye quantity space or a color space derived from it with the tone transformed).

In the above description, the term "kind of the film etc." means the distinction of films, namely, a black-and-white film, a negative film, and a reversal film, the brand of the film, the state of development, the density of the orange base (in the case of a negative film), etc. It is because films have characteristics remarkably changing in accordance with the kind that the above-mentioned information is to be utilized. There is a case of one-channel treatment where all of these are automatically treated. In the above sentence, the term "one-channel treatment" means a treatment such that the part for the treatment is regarded as a black box, and even if a source of any kind is inputted, it can be treated in the black box collectively.

Now, the set of signals, subjected to a color transform processing in the color transform section 1, are transmitted to the printer 15, and are outputted as a print. As regards the target color of the print at this time, it is appropriate to make it the color represented by the direct printing of a negative film, or the color to be represented by a reversal film used in photographing simultaneously with said negative film. Any way, the print should be finished to have a photographic tone.

Figure 9:
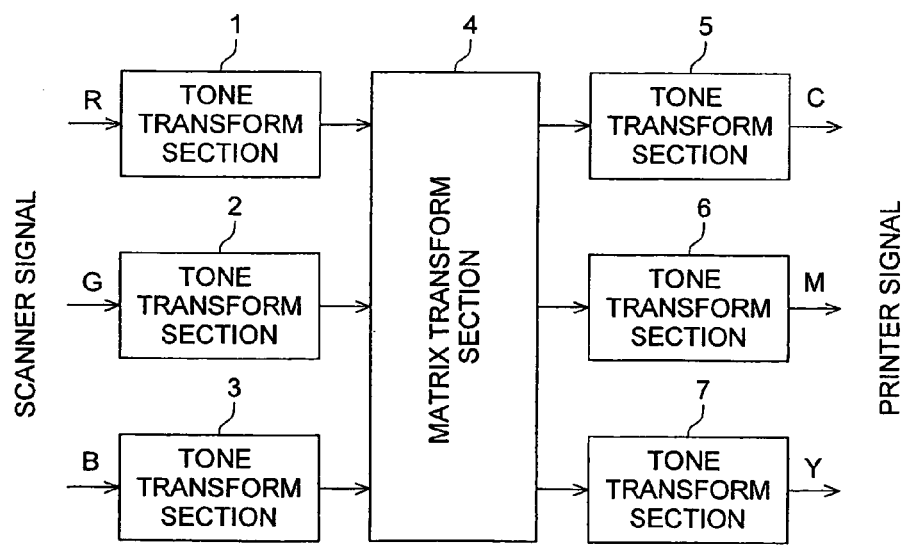
FIG. 9 is a conceptual drawing of a conventional system.

The structure of this color transform section 1 is the same as one shown in FIG. 9. First, a set of scanner signals are transformed into a set of signals in a logarithmic scale by the respective tone transform sections 1 to 3. Then, the output signals are controlled for the bias and gain by the same tone transform sections 1 to 3. Each of the output signals of these tone transform sections 1 to 3 is subjected to a linear transform in the succeeding matrix transform section 4, and after subjected to a further tone transform in each of the respective tone transform sections 5 to 7, the set of signals are transmitted to the printer 15.

Now, the image data, which are the outputs of the color transform section 1, are written in a storage device such as a CD-R. However, if the data are written as they are, although the image data are preserved, when a user displays the image of the stored image data as they are on a display device such as a CRT, the appearing color does not agree with the color of the print output. The reason is that the color characteristics of the printer are different from the color characteristics of the display device.

Therefore, by the use of a three-dimensional LUT interpolation means shown as the color transform section 2, these data are modified so as to become adapted to the display device. An example of the three-dimensional LUT interpolation means is shown in the publication of the unexamined patent application S53-123201 and its corresponding U.S. Pat. No. 5,087,126. The outline of the technology shown in it is as follows. A color space of a unit rectangular solid is divided into tetrahedrons each having four faces. Thus, the remarked color coordinate is necessarily contained in any one of the tetrahedrons. Therefore, in the case where the marked color coordinate exists in a certain tetrahedron, by the use of the coordinate values of the vertexes of the tetrahedron, color coordinates existing inside the tetrahedron are interpolated.

The preparation of an LUT for color transform used in this invention is carried out in the following way. The target color of the LUT is printer output color, and the reproduction color of the LUT is display device output color. That is, it is necessary that colors of a print outputted by the printer 15 become the same as display colors of the corresponding display on the display device (not shown in the drawing). In the characterization (determination of the characteristics) of the printer, the 5×5×5 combinations of CMY colors, which is the input of the printer, each being divided into 5 steps, are outputted, and color of the color chips in the color chart are measured. To measure the color of a color chip means to obtain tristimulus values (X, Y, Z) of the color chip. The tristimulus values are measurement values obtained by a sensor having the same spectral sensitivity as that of the human eyes (CIE color matching functions). Besides, as regards the display device, one meeting the aforementioned sRGB standard, which expresses the average characteristic of a representative CRT, is used.

Figure 2:
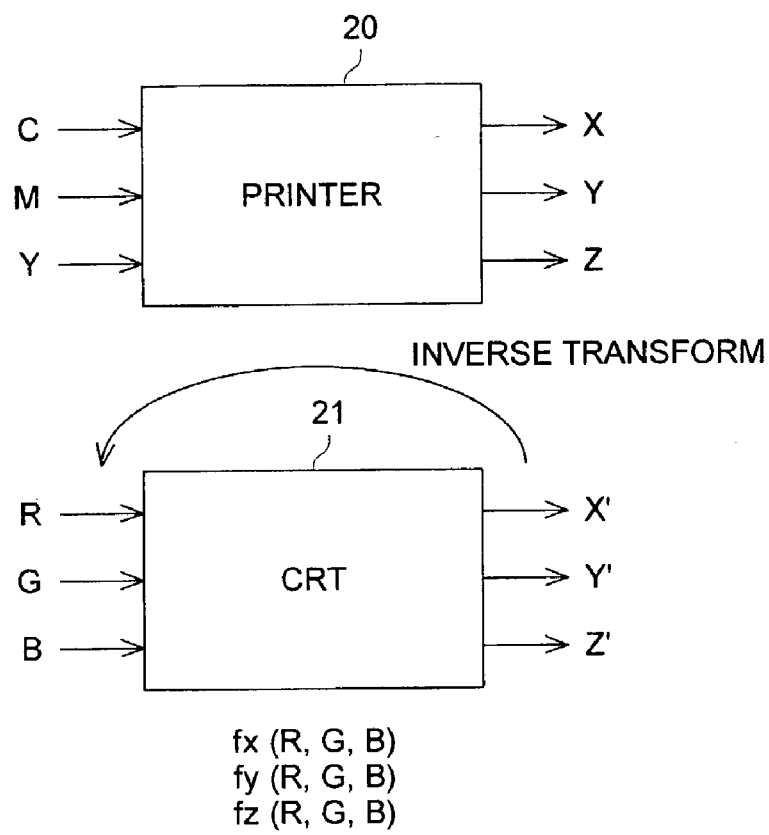
FIG. 2 is an illustrative drawing of preparation of an LUT.

FIG. 2 is an illustrative drawing of the preparation of an LUT. In the drawing, 20 denotes a printer for receiving inputted C, M, Y data and printing the image on a recording paper sheet. Let X, Y, and Z be the tristimulus values of an arbitrary pixel in an image printed by said printer 20. On the other hand, 21 denotes a CRT for receiving inputted R, G, B data and displaying the image on the screen. Let X', Y', and Z' be the tristimulus values of said pixel in said image displayed on the CRT. If every component of one of these two sets of tristimulus values X, Y, Z and X', Y', Z' takes the same value as the corresponding component of the other set, the color of a print obtained by the printer 20 appears the same as the color of the image displayed on the CRT 21 for the human eyes.

Now, it is supposed that the tristimulus values of the CRT 21 become X, Y, and Z. If the values of input data R, G, B to make tristimulus values X, Y, Z are known, the values of C, M, Y can be made in correspondence with R, G, B values. It can be considered that the CRT 21 has functions fx(R, G, B), fy(R, G, B), and fz(R, G, B) in it for outputting X, Y, Z by receiving R, G, B data. Then, by taking the inverse functions of these functions, one can obtain input values of R, G, and B for outputting X, Y, and Z by the inverse operation.

By the above-mentioned operation processing, data of R, G, and B to have the same tristimulus values as C, M, and Y are to be obtained. Then, if the correspondence relationship between two sets of values, which are composed of all the combinations of all values of C, M, Y and R, G, B respectively is expressed in a table, an LUT for color transform, which is the LUT (LUT2) in the color transform section 2 in this explanation, can be obtained. In this case, it is possible to use a uniform color space (L*u*v*, for example) instead of the XYZ system.

Figure 3:
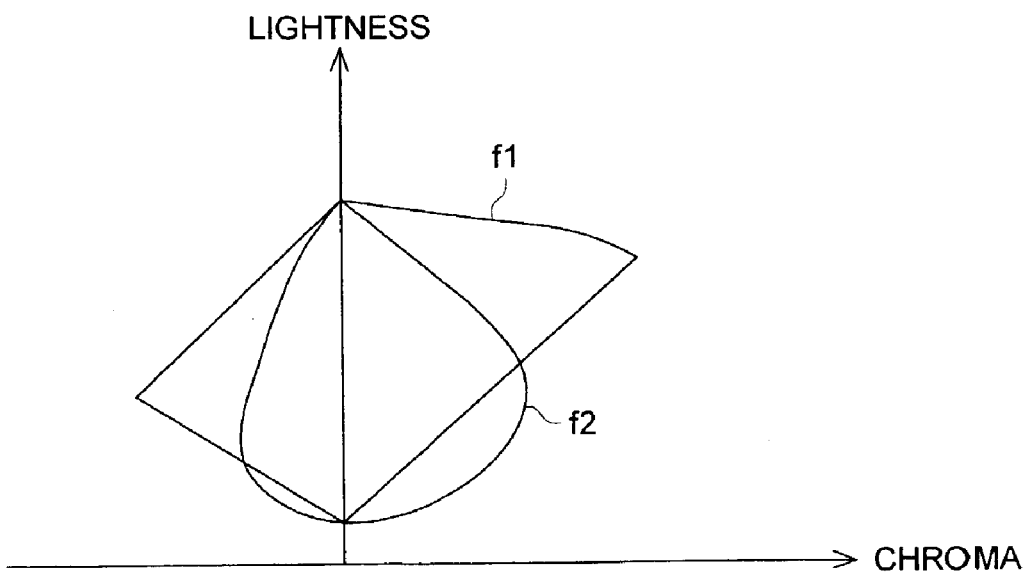
FIG. 3 is a drawing showing the color characteristics of a CRT and a printer.

A problem raised in the preparation of this LUT2 for color transform, the difference in the color gamut. FIG. 3 is a drawing showing the color characteristic of a CRT and that of a printer. The abscissa represents chroma, and the ordinate represents lightness. If a color takes a larger value for the lightness axis (gray axis), it becomes lighter, and if it takes a larger value for the chroma axis, it becomes more vivid. The curve f1 shows the characteristic of the CRT and f2 shows the characteristic of the printer. It is understood that there are regions that are not common to characteristics of one color gamut and the other color gamut.

In the case where the printer color is taken for the target color and the CRT color to be represented by the sRGB system is taken for the reproduction color, the printer color has a larger color gamut at a hue in the neighborhood of shaded magenta and cyan. For this reason, it is necessary to contract the color gamut of the printer color. Further, on the contrary, the CRT color to be represented by the sRGB has a larger color gamut in the neighborhood of highlight areas; therefore, if color gamut mapping is done in a usual way, it is impossible to thoroughly use the whole color gamut of the CRT. Then, for such a part, matching is made by the extension of the color gamut of the printer color.

By the practice of the above-mentioned things, it is possible to prepare an LUT by which the whole color gamut is used thoroughly. Therefore, an LUT of a printer→an sRGB device link can be prepared. The number of lattice points at this time is, for example, 33×33×33, but 16×16×16 is also appropriate (In this case, 256 can be divided by it with no remainder left, which means that the error is made smaller.).

There are various ways of contracting a color gamut. For example, they are described in "(Revised) Fundamentals of Photographic Engineering, published by Corona Co., Ltd. (1998) pp. 649 to 651" (in Japanese) in detail. Typically, the correspondence relation is given through the extension or contraction in accordance with the chroma values at the color gamut surface.

In this example of the embodiment, also in the color transform section 3, the above-mentioned three-dimensional LUT interpolation means is used. An LUT used here is obtained by the following calculation on the basis of the LUT of the color transform section 2. First, an inverse operation is done from the output values of the LUT2 (the LUT in the color transform section 2). That is, because the output of the LUT2 is 0 to 255, if these values are divided into 33 steps, the values 0, 8, 16, - - - , 232, 240, 248, 255 are obtained. These 33 step values for each of R, G, and B are combined to become combination values r g b, and 4 points surrounding each of the combination values r g b are to be found in the outputs of the LUT2.

Incidentally, the reason for the number of points surrounding a combination value r g b being 4 is that the simplest solid in a three-dimensional space represented by a combination of three coordinate values is a tetrahedron, which has 4 apexes, and it is considered that there exists the objective point inside this tetrahedron. By the use of these 4 points, the input combination values of the LUT2 are calculated.

Then, because each of the calculated output values may fall between two of the integral values 0 to 32, the values obtained from these through a normalization by 255/33 for the target combination values r g b, and is the answer for one of the combinations of input values of the LUT3 (the LUT in the color transform section 3). By this calculation for all combinations of 33×33×33, the LUT3 having the inverse relation with the LUT2 can be calculated.

As regards this method, it can be utilized a method which is the same as one shown in "Po-Chieh Hung, Colorimetric Characterization of Electronic Imaging Devices Using a Look-Up-Table Model and Interpolations, Journal of Electronic Imaging, 2(1), 53–61 (1993)". In this way, the LUT in the color transform section 3 (LUT3) can be prepared.

Figure 4:
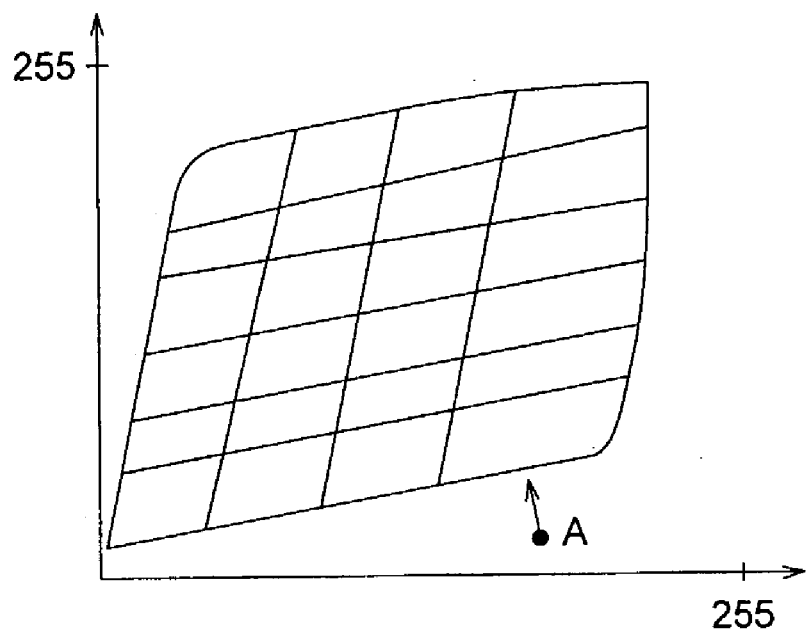
FIG. 4 is an illustrative drawing of mapping.

If the above-mentioned combination is not to be found (for example, 4 points to surround the data point in the three-dimensional space do not exist), mapping may be done to the nearest neighbor point, or mapping may be done to the intersection point of the straight line drawn from the target point towards the center of the color solid and the color gamut surface as described in the above-mentioned literature. FIG. 4 is an illustrative drawing of mapping in a two-dimensional case. There is a case where a target point is located outside the region composed of lattice points as shown by the point A. Then, in such a case, the point A is mapped to the nearest neighbor point so as to take in the data of the point A. Although a two-dimensional case is explained here, a problem similar to the two-dimensional case is produced also in a three-dimensional case; therefore, a problem relating to mapping is produced for a three-dimensional case.

The LUT3 calculated in this way is in the inverse relationship with the LUT2 such that an arbitrary image data, after transformed by the LUT2, is again transformed by the LUT3 to come to have approximately the same value as the original data if the interpolation error is eliminated. In addition, a converging operation (described in the publication of the Japanese patent No. 2528463) can be used for this calculation, but the calculation time becomes longer.

The case where the values of the LUT3 obtained in the above-mentioned explanation have an error is a case where a designation point is not to be found and the relation of correspondence is not established in such a way that the whole color gamut is used.

In this example of the embodiment, explanation has been made for the case where the LUT3, which is in the inverse relation with the LUT2, is calculated after the LUT2 has been calculated. However, it is also possible to obtain the LUT2 by the above-mentioned inverse operation after the calculation of the LUT3 for the transform sRGB→a printer is carried out first. Because the system sRGB→a print is frequently used as the LUT for the case where a print is produced from a digital camera, for the purpose of giving priority to the method of mapping in this direction, it is desirable to prepare the LUT3 first (On the contrary, if cases where an image from a film scanner is displayed on a CRT occur more frequently, it is desirable to give priority to the preparation of the LUT2.).

In this way, by an example of the embodiment of this invention, in the case where LUT's for color transform having the inverse relation with each other are prepared, one of them is prepared as a multi-dimensional LUT, and the other LUT can be prepared on the basis of the LUT first prepared. By a procedure as this, the calculation is simplified and the precision of restoration is raised.

As described in the above, by an example of the embodiment of this invention, a color transform with a minimum amount of processing can be used in the case where image data are transformed directly for an output apparatus, and in the case where image data are outputted by another electronic storage medium and are displayed on a CRT or the like, the image can be reproduced with a color approximately resembling a color represented by the printer; further, in the case where image data which have been written in the electronic storage medium is printed, the color reproduction becomes equal to that obtained in the case where the image is directly printed, and stable color reproduction is possible.

Further, by an example of the embodiment of this invention, by the use of the scanner 10 for the image input apparatus, in the case where color reproduction with a photographic tone is carried out, it is easy to make sending and receiving of image data to and from another image medium.

(Method in Cases where Color Gamut is not Fully Used, or Method to Optimize it)

As regards the LUT prepared in the above-mentioned explanation (LUT2 and LUT3), there is a problem that tone reproduction is disturbed in some cases, owing to the color gamut mapping depending on the distorted color gamut boundary. For the purpose of avoiding the occurrence of such a problem, it is used a method in which smoothing is applied to the finished LUT. The term "smoothing" used herein means an operation to substitute the value of a pixel of remark by the average of the pixel values over the 27 surrounding pixels including it.

Figure 5:
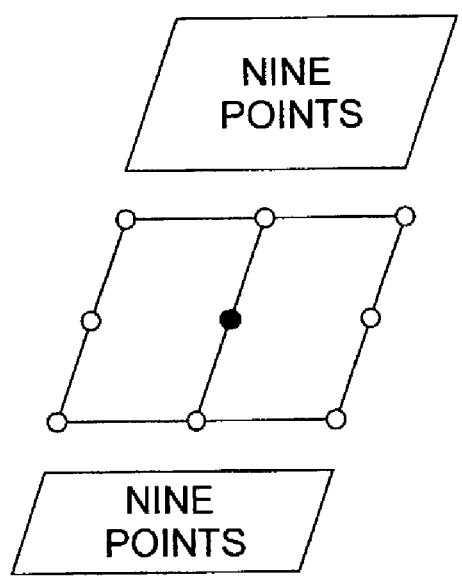
FIG. 5 is an illustrative drawing of smoothing.

FIG. 5 is an illustrative drawing of smoothing. There are 9 data in the plain containing the objective point (shown by ● in the drawing), 9 data over it, and 9 data also under it; therefore, the smoothing of the objective point is done by taking the average over 27 points. However, in the case where the objective point is located in the neighborhood of the boundary and no surrounding points exists in the outer side, the data of points located in that side are not to adopted. For example, if the point of remark is located on a boundary surface, the average over 9 points is taken, if it is located at a boundary edge, the average over 3 points is taken, and if it is located at a boundary corner, average processing is not made, and its own value is used.

Figure 6:
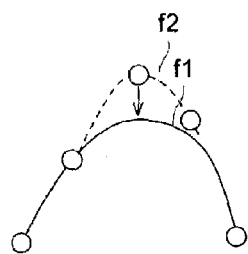
FIG. 6 is an illustrative drawing of shrinking.

By the processing done in this way, no shrinking occurs for an original color point (a point located at a boundary corner of the gamut), but there are some cases where the color gamut shrinks by the averaging processing although it depends on the values on the boundary surface of the color gamut. FIG. 6 is an illustrative drawing of shrinking, shown for a one-dimensional case. If subjected to smoothing, a characteristic as shown by f2 becomes a characteristic as shown by f1. In this case, the characteristic of f2 has shrunk by the amount shown by the arrow mark. Similar shrinking occurs also in a three-dimensional case, but it may be neglected if this amount is small.

When an image is printed on the basis of data recorded in an electronic medium, if the data are those which have been transformed by the use of the LUT2, the print is made by the printer 15 after the data are subjected to color transform by the LUT3. However, if the data recorded in the electronic medium are those which have been recorded by another image input apparatus (for example, a digital camera or a computer graphics), it is used an LUT prepared by a different color gamut mapping, not by the above-mentioned color gamut mapping, (referred to as the LUT3r in the sense that it corresponds to the LUT3).

The LUT3r is one that is optimized for a representative image data source in the case of printing on the basis of image data of sRGB. This optimization is carried out by the modification of the procedure of color gamut mapping. AS regards the judgment whether or not the data have been written by the use of the LUT2, it is made by the checking if there is a part of the color gamut which cannot be used by the LUT2. In another way, the judgment can be made by the presence or absence of a judgment flag of the input means which has been written at the time of writing the data in the medium. Typically, if there is the flag written in this system, the reversible LUT3 is used, and if there is no flag, the LUT3r optimized in another way is used. In this way, because an optimized LUT can be automatically utilized, a printer with the ease of operation can be actualized.

As regards the above-mentioned color transform section 2 and color transform section 3, it is most desirable to use an LUT interpolation method, but it is also appropriate to use it in combination with a matrix transform, tone transform, an LUT for carrying out a desirable color transform, or the like.

Figure 7:
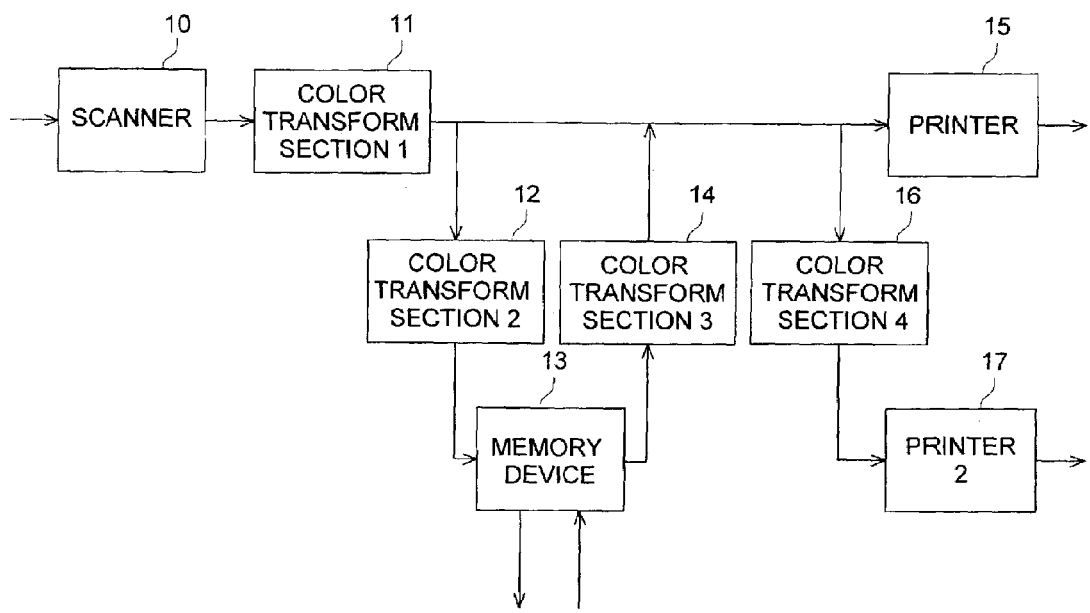
FIG. 7 is a block diagram showing the second example of the embodiment of this invention.

FIG. 7 is a block diagram showing the second example of the embodiment of this invention. The same items as shown in FIG. 1 is shown with the same sign attached. This example of the embodiment is such one that is provided with a color transform section 16 for applying a color transform to an output of the color transform section 1 (hereinafter referred to as the color transform section 4), and carried out printing by another printer on the basis of an output of this color transform section 4.

In the case where a printer of 4-color output such as an ink jet printer (or one with the larger number of colors such as a hifi color printer) is used for the printer 17, supposing that a structure as shown in FIG. 7, it is possible to prepare the color transform section 4 with the color reproduction of the primary printer 15 used as the target. In this case, a color gamut broader than the color gamut of the primary printer 15 is mostly used. For this reason, the color gamut mapping is generally such one as to enlarge the color gamut. In another way, it is also appropriate to assume the characteristic of a reversal film writer (having a broader color gamut than a print by a usual printer) for the characteristic of the primary printer 15.

Figure 8:
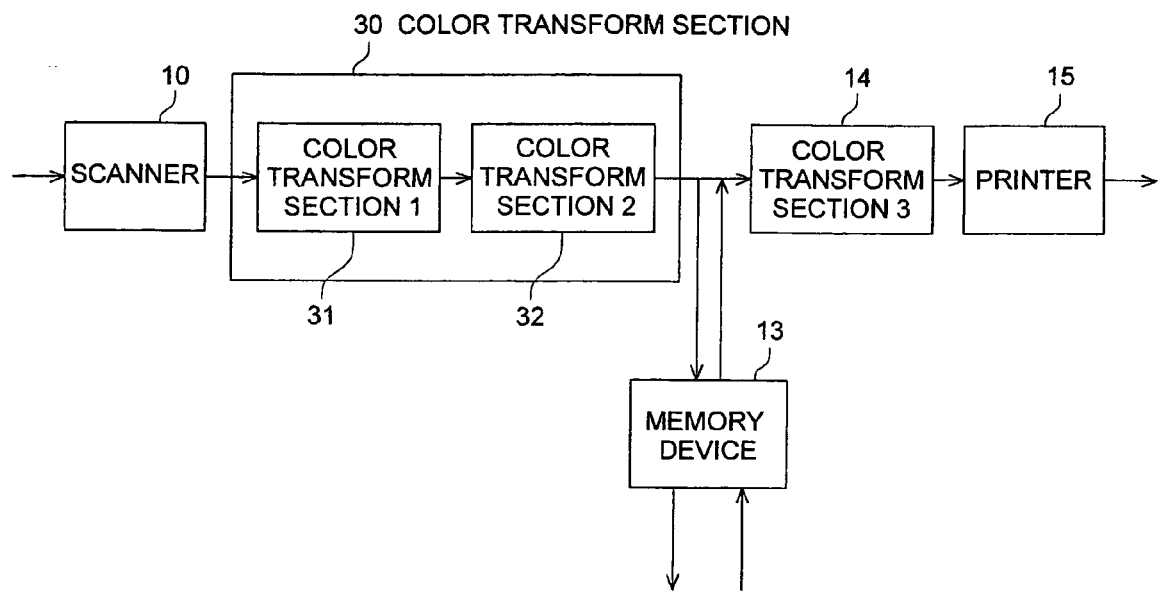
FIG. 8 is a block diagram showing the third example of the embodiment of this invention.

Further, for an example of another structure, a method using the concept of color management using the sRGB color space can be cited. FIG. 8 is a block diagram showing the third example of the embodiment of this invention. The items the same as those which are shown in FIG. 1 are shown with the same sign attached. In the drawing, 30 denotes a color transform part for receiving an output of a scanner 10 and practicing color transform, and comprises a color transform section 31 (a color transform section 1) and a color transform section 32 (a color transform section 2). The color transform section 1 and the color transform section 2 in this example correspond to the color transform section 1 and the color transform section 2 shown in FIG. 1 respectively. In this example, the color transform part 30 is considered as a unified part made up of the color transform section 1 and the color transform section 2.

The color transform section 1 uses the system shown in FIG. 9, and the color transform section 2 receives output signals of the color transform section 1 and transforms them into signals representing a correct color when the image is displayed on a CRT adapted to the sRGB standards. It raises no problem that the color transform section 1 and the color transform section 2 are combined to become a composite at the time of an actual image transform. Because image data transformed by this are represented in the sRGB color space, they can be recorded in an electronic medium or the like as they are.

However, in the case of a structure as described in the above, there exist a plurality of color transforms in the path from the scanner to the printer, even when an image is directly printed; this results in the lowering of the precision by the color transforms of plural times, or in the increase of the amount of operation. If the color transform section 1 to the color transform section 3 are combined together to become a composite, it is equivalent to the case where only the color transform section 1 is used. In this case, one transform means is used, and image data are used with appropriate LUT data.

As regards the content of the color transforms explained in the above-mentioned examples of the embodiment, the first example of the embodiment (FIG. 1), the second example of the embodiment (FIG. 7), and the third example of the embodiment, it is simple to structure a single unit by combining a multi-dimensional LUT and a interpolation means; however, it is also possible to add a tone transform or a matrix operation before or after them.

EFFECT OF INVENTION

As explained in the foregoing, the following effects can be obtained by this invention.

By the structure (1), only a color transform of a minimum amount of processing is required in the case where image data are transformed directly for an output apparatus, and in the case where image data are outputted by another image medium and are displayed on a CRT or the like, the image can be reproduced with a color approximately resembling a color represented by a printer; further, in the case where an image is printed on the basis of image data written in the electronic medium, the color reproduction becomes equal to that in the case of the image being directly printed, and a stable color reproduction is possible.

By the structure (2), in the case where color reproduction with a photographic tone is carried out, the sending and receiving of image data to and from another medium is easily done.

By the structure (3), because an optimized LUT is automatically utilized, it is possible to actualize a printer having the ease of operation.

By the structure (4), calculation is simplified, and the precision of restoration is raised.

By the structure (5), in respect of a transform from a CMY system to an RGB system and a transform from an RGB system to a CMY system, it is possible to bring these transforms in an approximately inverse relationship.

By the structure (6), it is possible to prepare an LUT on the basis of tristimulus values or color values derived from tristimulus values.

By the structure (7), in bilateral transforms between two image mediums, namely, a transform from one image medium to another image medium, and a transform from said another medium to said one medium, it is possible to make the relation between them approximately inverse.

By the structure (8), only a color transform of a minimum amount of processing is required in the case where image data are transformed directly for an output apparatus, and in the case where image data are outputted by another electronic storage medium and are displayed on a CRT or the like, the image can be reproduced with a color approximately resembling a color represented by a printer; in the case where an image is printed on the basis of image data written in the electronic storage medium, the color reproduction becomes equal to that in the case of the image being directly printed, and a stable color reproduction is possible.

In this way, by this invention, it is possible to provide an image processing method and an image processing apparatus capable of, in the case where a negative film is read by a scanner, making a color to be obtained by printing and a color to be reproduced on a display approximately the same. Further, in this case, LUT's which are in the inverse relationship with each other are used, and it is possible to provide an image processing method and an image processing apparatus capable of carrying out the calculation of the above-mentioned LUT's exactly and easily. Furthermore, it is possible to provide an image processing method and an image processing apparatus capable of, even in the case where image data are not those which have been recorded by this system, easily applying an optimized color transform to the image data.

What is claimed is:

1. An image processing method for subjecting image data from an image input apparatus to a color transform and to an image processing for an output apparatus, comprising:
   conducting a first color transform process to practice color transform from data for a CMY system into data for a RGB system; and
   conducting a second color transform process to practice a color transform from data for the RGB system to data for the CMY system,
   wherein the first color transform process and the second color transform process are in an approximately inverse relation with each other, and are practiced in such a way as to make tristimulus values of colors in an image printed by a printer using the CMY system approximately equal to tristimulus values of colors in an image displayed on a display using the RGB system, or to make color values derived from the tristimulus values of colors in an image printed by the printer using the CMY system approximately equal to color values derived from the tristimulus values of colors in an image displayed on the display using the RGB system.

2. The image processing method of claim 1, wherein the image input apparatus is a scanner for obtaining a digital image data by the scanning of a photographic medium.

3. The image processing method of claim 1, wherein one of the first color transform process and the second color transform process is practiced by the use of an multi-dimensional LUT, and the other of the first color transform process and the second color transform process is practiced by the use of an LUT prepared on the basis of the multi-dimensional LUT.

4. An image processing method for subjecting image data from an image input apparatus to a color transform and to an image processing for an output apparatus, comprising:
   conducting a first color transform process to practice color transform from data for a first image medium into data for an second image medium;
   conducting a second color transform process to practice a color transform from data for the second image medium to data for the first image medium, wherein the first color transform process and the second color transform process are in an approximately inverse relation with each other; and
   checking, when the image data are subjected to a color transform from the data for the second image medium to the data for the first medium, whether or not the image data are transformed by a color transform corresponding to the first color transform process; and
   selecting another color transform in cases where the image data are transformed by a color transform not corresponding to the first color transform process.

5. An image processing apparatus for carrying out a color transform of image data from an image input apparatus and applying image processing for an output apparatus to the image data, comprising:

a first color transform section for carrying out a color transform of data for a CMY system into data for a RGB system; and a second color transform section for carrying out a color transform of data from the RGB system to data for the CMY system, wherein a function of the first color transform section and a function of the second transform section are in an approximately inverse relation with each other, and are practiced in such a way as to make tristimulus values of colors in an image printed by a printer using the CMY system approximately equal to tristimulus values of colors in an image displayed on a display using the RGB system, or to make color values derived from the tristimulus values of colors in an image printed by a printer using the CMY system approximately equal to color values derived from the tristimulus values of colors in an image displayed on a display using the RGB system.

6. The image processing apparatus of claim 5, wherein the image input apparatus is a scanner for obtaining a digital image data by the scanning of a photographic medium.

7. The image processing apparatus of claim 5, wherein one of functions of the first color transform section and the second color transform section is practiced by the use of an multi-dimensional LUT, and the other of the functions of the first color transform section and the second color transform section is practiced by the use of an LUT prepared on the basis of the multi-dimensional LUT.

8. An image processing apparatus for subjecting image data from an image input apparatus to a color transform and to an image processing for an output apparatus, comprising:

a first color transform section for carrying out a color transform from data for a first image medium into data for a second image medium;

a second color transform section for carrying out a color transform of data from the second image medium into data for the first image medium, wherein a function of the first color transform section and a function of the second transform section are in an approximately inverse relation with each other; and a checking section for checking, when the image data are subjected to a color transform from data for the second image medium to data for the first image medium, whether or not the image data are transformed by a color transform corresponding to the first color transform section, and for selecting another color transform in cases where the image data are transformed by a color transform not corresponding to the first color transform section.

* * * * *